United States Patent
Gur-esh et al.

(10) Patent No.: US 10,296,590 B2
(45) Date of Patent: *May 21, 2019

(54) TECHNIQUES FOR MANAGING PERSISTENT DOCUMENT COLLECTIONS

(71) Applicant: Microsoft Technology Licensing, LLC, Redmond, WA (US)

(72) Inventors: Ethan Gur-esh, Seattle, WA (US); Nathan Fink, Seattle, WA (US); Dustin Friesenhahn, Bellevue, WA (US); Nithya Ramkumar, Redmond, WA (US); Maura J. FitzGerald, Swampscott, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/453,320

(22) Filed: Mar. 8, 2017

(65) Prior Publication Data
US 2017/0192968 A1    Jul. 6, 2017

Related U.S. Application Data

(63) Continuation of application No. 14/736,839, filed on Jun. 11, 2015, now Pat. No. 9,740,693, which is a
(Continued)

(51) Int. Cl.
*G06F 17/30* (2006.01)
(52) U.S. Cl.
CPC .. *G06F 17/30011* (2013.01); *G06F 17/30174* (2013.01); *G06F 17/30864* (2013.01); *G06F 17/30896* (2013.01)
(58) Field of Classification Search
CPC ......... G06F 17/30011; G06F 17/30864; G06F 17/30174; G06F 17/30896
See application file for complete search history.

(56) References Cited

U.S. PATENT DOCUMENTS

| 5,568,640 A | 10/1996 | Nishiyama et al. |
| 5,790,790 A | 8/1998 | Smith et al. |

(Continued)

FOREIGN PATENT DOCUMENTS

| KR | 100434728 B1 | 5/2004 |
| RU | 2236699 C1 | 9/2004 |

OTHER PUBLICATIONS

"Office Action Issued in European Patent Application No. 09836584. 4", dated Jun. 13, 2017, 7 Pages.
(Continued)

*Primary Examiner* — Cam Y T Truong
(74) *Attorney, Agent, or Firm* — NovoTechIP International PLLC

(57) ABSTRACT

Various technologies and techniques are disclosed for creating and managing persistent document collections. A data store is used for storing one or more persistent document collections. A content management application is used for managing documents for users, for creating one or more persistent document collections of a sub-set of the documents upon user request, and for storing the one or more persistent document collections in the data store. Users can create one or more persistent document collections from a sub-set of the documents. Users can also modify the one or more persistent document collections. A requested portion of one or more persistent document collections can be output upon request from an external application so that the external application can download one or more of the documents that are represented by the persistent document collection for further modification by the user.

14 Claims, 13 Drawing Sheets

Related U.S. Application Data continuation of application No. 14/602,822, filed on Jan. 22, 2015, now Pat. No. 9,626,362, which is a continuation of application No. 12/336,554, filed on Dec. 17, 2008, now Pat. No. 8,965,926.

(56) References Cited

U.S. PATENT DOCUMENTS

| | | |
|---|---|---|
| 5,790,793 A | 8/1998 | Higley |
| 5,870,765 A | 2/1999 | Bauer et al. |
| 5,907,324 A | 5/1999 | Larson et al. |
| 5,987,479 A | 11/1999 | Oliver |
| 6,009,442 A | 12/1999 | Chen et al. |
| 6,014,677 A | 1/2000 | Hayashi et al. |
| 6,094,657 A | 7/2000 | Hailpern et al. |
| 6,144,991 A | 11/2000 | England |
| 6,209,004 B1 | 3/2001 | Taylor |
| 6,236,987 B1 | 5/2001 | Horowitz et al. |
| 6,295,541 B1 | 9/2001 | Bodnar et al. |
| 6,493,702 B1 | 12/2002 | Adar et al. |
| 6,584,466 B1 | 6/2003 | Serbinis et al. |
| 6,615,259 B1 | 9/2003 | Nguyen et al. |
| 6,636,863 B1 | 10/2003 | Friesen |
| 6,934,740 B1 | 8/2005 | Lawande et al. |
| 7,107,226 B1 | 9/2006 | Cassidy et al. |
| 7,269,433 B2* | 9/2007 | Vargas ............... H04M 1/7253 455/502 |
| 7,284,191 B2 | 10/2007 | Grefenstette et al. |
| 7,418,664 B2 | 8/2008 | Ben-Shachar et al. |
| 7,702,730 B2 | 4/2010 | Spataro et al. |
| 7,725,456 B2 | 5/2010 | Augustine |
| 7,792,789 B2 | 9/2010 | Prahlad et al. |
| 7,810,027 B2 | 10/2010 | Bendik |
| 7,831,430 B2 | 11/2010 | Dodrill et al. |
| 8,019,811 B1 | 9/2011 | Britto et al. |
| 8,078,694 B2 | 12/2011 | Barton et al. |
| 2002/0040431 A1 | 4/2002 | Kato et al. |
| 2002/0078035 A1 | 6/2002 | Frank et al. |
| 2002/0156840 A1 | 10/2002 | Ulrich et al. |
| 2003/0046351 A1 | 3/2003 | Maruyama et al. |
| 2003/0097410 A1 | 5/2003 | Atkins et al. |
| 2003/0126157 A1 | 7/2003 | Young et al. |
| 2004/0098383 A1* | 5/2004 | Tabellion ............ G06F 17/3007 |
| 2004/0160629 A1 | 8/2004 | Hull et al. |
| 2004/0201604 A1* | 10/2004 | Kraenzel ............... G06Q 10/10 715/700 |
| 2004/0204085 A1* | 10/2004 | Vargas ............... H04M 1/7253 455/557 |
| 2005/0027796 A1* | 2/2005 | San Andres .......... G06F 11/201 709/203 |
| 2005/0038836 A1* | 2/2005 | Wang .................... G06F 3/0601 |
| 2005/0060337 A1 | 3/2005 | Chou et al. |
| 2005/0216524 A1 | 9/2005 | Gomes et al. |
| 2005/0273476 A1* | 12/2005 | Wertheimer ........ G06F 11/1458 |
| 2006/0074928 A1 | 4/2006 | MacLaurin et al. |
| 2006/0136837 A1 | 6/2006 | Ben-Shachar et al. |
| 2006/0184540 A1* | 8/2006 | Kung .................. G06F 17/3089 |
| 2006/0195480 A1* | 8/2006 | Spiegelman ...... G06F 17/30766 |
| 2007/0100807 A1 | 5/2007 | Abe et al. |
| 2007/0124348 A1* | 5/2007 | Claborn .............. G06F 11/2025 |
| 2007/0136395 A1 | 6/2007 | Fries et al. |
| 2007/0239802 A1 | 10/2007 | Razdow et al. |
| 2007/0250531 A1 | 10/2007 | Wiggins et al. |
| 2008/0005138 A1 | 1/2008 | Gauthier et al. |
| 2008/0005183 A1 | 1/2008 | Bostick et al. |
| 2008/0040239 A1 | 2/2008 | Jacobi et al. |
| 2008/0077631 A1 | 3/2008 | Petri |
| 2008/0140766 A1 | 6/2008 | Mohan |
| 2008/0177708 A1 | 7/2008 | Ayyar et al. |
| 2008/0189595 A1 | 8/2008 | Petri |
| 2008/0222108 A1* | 9/2008 | Prahlad ............. G06F 17/30616 |
| 2008/0228675 A1 | 9/2008 | Duffy et al. |
| 2008/0281915 A1 | 11/2008 | Elad et al. |
| 2009/0063959 A1 | 3/2009 | Stejic |
| 2009/0282088 A1* | 11/2009 | Thomas ................. H04L 67/02 |
| 2009/0287731 A1* | 11/2009 | Motoyama ............ G06Q 10/06 |
| 2010/0070469 A1 | 3/2010 | Bomma et al. |
| 2010/0082548 A1 | 4/2010 | Crockett et al. |

OTHER PUBLICATIONS

"Notice of Allowance Issued in Korean Patent Application No. 10-2011-7013330", dated Oct. 21, 2015, 6 Pages.

"Notice of Allowance Issued in Australian Patent Application No. 2009333727", dated Aug. 4, 2014, 2 Pages.

"Office Action Issued in Australian Patent Application No. 2009333727", dated Mar. 21, 2014, 3 Pages.

"Office Action Issued in Australian Patent Application No. 2009333727", dated May 23, 2014, 3 Pages.

"Notice of Allowance Issued in Chinese Patent Application No. 200980151658.X", dated Aug. 28, 2013, 4 Pages.

"First Office Action & Search Report Issued in Chinese Patent Application No. 200980151658.X", dated Nov. 29, 2012, 11 Pages.

"Notice of Allowance Issued in Russian Patent Application No. 2011124538", dated Jun. 30, 2014, 8 Pages. (W/o English Translation).

"Office Action Issued in Russian Patent Application No. 2011124538", dated Oct. 23, 2013, 4 Pages. (W/o English Translation).

"Notice of Allowance Issued in Mexico Patent Application No. MX/a/2011/006439", dated Sep. 11, 2014, 2 Pages. (W/o English Translation).

"Office Action Issued in Mexico Patent Application No. MX/a/2011/006439", dated Jul. 12, 2013, 3 Pages. (W/o English Translation).

"International Search Report & Written Opinion Issued in PCT Application No. PCT/US09/63754", dated Jun. 15, 2010, 6 Pages.

"Non-Final Office Action Issued in U.S. Appl. No. 14/602,822", dated May 21, 2015, 36 Pages.

"Notice of Allowance Issued in U.S. Appl. No. 14/602,822", dated Dec. 16, 2016, 17 Pages.

"Notice of Allowance Issued in U.S. Appl. No. 14/602,822", dated Feb. 17, 2017, 2 Pages.

"Final Office Action Issued in U.S. Appl. No. 15/642,151", dated Mar. 21, 2018, 51 Pages.

"Non Final Office Action Issued in U.S. Appl. No. 15/642,151", dated Sep. 6, 2018, 64 Pages.

"Non Final Office Action Issued in U.S. Appl. No. 15/642,151", dated Nov. 16, 2017, 44 Pages.

"Heavy Metal Shopping Cart Software", Retrieved From <<https://web.archive.org/web/20090307040518/http://www.make-a-store.com:80/site/category/p0_CRM_Customer Relations_Management_Software>>, Oct. 14, 2008, 2 Pages.

"Non Final Office Action Issued in U.S. Appl. No. 14/602,822", dated Mar. 24, 2016, 68 Pages.

"Final Office Action Issued in U.S. Appl. No. 14/602,822", dated Sep. 24, 2015, 47 Pages.

Das, et al., "Creating Digital Repository by Using GSDL: Review and Analysis", Retrieved From <<http://web.archive.org/web/*/http://www.healthnet.org.np/ocs/index.php/icikm-2008/icikm/paper/-%20viewFile/16/107, Jan. 2008, 12 Pages.

"Office Action Issued in U.S. Appl. No. 12/336,554", dated Feb. 28, 2011, 15 Pages.

"Notice of Allowance Issued in U.S. Appl. No. 12/336,554", dated Oct. 9, 2014, 16 Pages.

"Non-Final Office Action Issued in U.S. Appl. No. 12/336,554", dated Apr. 10, 2014, 19 Pages.

"Non-Final Office Action Issued in U.S. Appl. No. 12/336,554", dated Apr. 16, 2012, 15 Pages.

"Final Office Action Issued in U.S. Appl. No. 12/336,554", dated Aug. 26, 2011, 18 Pages.

"Final Office Action Issued in U.S. Appl. No. 12/336,554", dated Dec. 17, 2012, 17 Pages.

"Supplementary European Search Report Issued in Patent Application No. 09836584.4", dated Nov. 28, 2012, 6 Pages.

Rajasekar, et al., "Collection-Based Persistent Archives", In Proceedings of the 16th IEEE Symposium on Mass Storage Systems, pp. 176-184.

(56) References Cited

OTHER PUBLICATIONS

"Notice of Allowance Issued in U.S. Appl. No. 14/736,839", dated Apr. 17, 2017, 16 Pages.
"Non Final Office Action Issued in U.S. Appl. No. 14/736,839", dated Mar. 30, 2016, 35 Pages.
"Final Office Action Issued in U.S. Appl. No. 14/736,839", dated Aug. 4, 2016, 35 Pages.
"Non-Final Office Action Issued in U.S. Appl. No. 14/736,839", dated Dec. 15, 2016, 23 Pages.
"Non-Final Office Action Issued in U.S. Appl. No. 14/736,839", dated Oct. 8, 2015, 21 Pages.
"Final Office Action Issued in U.S. Appl. No. 14/602,822", dated Aug. 2, 2016, 77 Pages.
"Final Office Action Issued in U.S. Appl. No. 15/642,151", dated Jan. 14, 2019, 44 Pages.

\* cited by examiner

TECHNIQUES FOR MANAGING PERSISTENT DOCUMENT COLLECTIONS

CROSS-REFERENCE TO RELATED APPLICATIONS

This application is a continuation of, claims the benefit of and priority to, previously filed U.S. patent application Ser. No. 14/736,839 entitled "Techniques for Managing Persistent Document Collections" filed on Jun. 11, 2015, which is a continuation of, claims the benefit of and priority to, previously filed U.S. patent application Ser. No. 14/602,822 entitled "Techniques for Managing Persistent Document Collections" filed on Jan. 22, 2015, which is a continuation of, claims the benefit of and priority to, previously filed U.S. patent application Ser. No. 12/336,554 entitled "Techniques for Managing Persistent Document Collections" filed on Dec. 17, 2008, and issued on Feb. 24, 2015 as U.S. Pat. No. 8,965,926, the subject matter of which are hereby incorporated by reference in their entireties.

BACKGROUND

Many document management applications such as MICROSOFT® Office SharePoint Server enable users to organize documents in a series of lists or libraries. Such document management applications can typically be accessed through a web browser or a rich client interface, and make it easy for organizations to share documents with various team members. When adding a new document through the document management application, the user typically selects which list or library to add the document to. Other users can then find that document by accessing that library specifically, or by performing one or more query searches across libraries to locate one or more documents of interest.

If the user wants to work with the same set of documents over a period of time, he or she typically has two options. The first option is that the user can perform the search multiple times to keep re-locating the documents. The second option is that the user can keep track of which varying libraries actually contain the documents that he or she is interested in working with. And then each time the user is ready to work with those documents, he/she must navigate to those respective libraries one by one to access the respective document of interest.

SUMMARY

Various technologies and techniques are disclosed for creating and managing persistent document collections. In one implementation, a system for creating and managing persistent document collections is described. The system includes a data store is used for storing one or more persistent document collections. The system also includes a content management application that is used for managing documents for users, for creating one or more persistent document collections of a sub-set of the documents upon user request, and for storing the one or more persistent document collections in the data store.

In another implementation, a method is disclosed for enabling users to create and manage one or more persistent document collections. Documents that are managed by a content management application are displayed for user review. An add selection is received from a user which specifies at least one of the documents to add to a persistent document collection. The user can optionally specify additional attributes about the persistent document collection, such as storage space to allocate, etc. The persistent document collection is then created and stored in a data store.

In yet another implementation, techniques are described for a content management application that also allows external applications to access and manage documents contained in one or more persistent document collections. Users can create one or more persistent document collections from a sub-set of the documents. Users can also modify the one or more persistent document collections. A requested portion of one or more persistent document collections can be output upon request from an external application so that the external application can download one or more of the documents that are represented by the persistent document collection for further modification by the user.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 is a simulated screen for one implementation that illustrates selecting a persistent document collection to add the selected documents to.

DETAILED DESCRIPTION

The technologies and techniques herein may be described in the general context as an application that manages persistent document collections, but the technologies and techniques also serve other purposes in addition to these. In one implementation, one or more of the techniques described herein can be implemented as features within a content management application such as MICROSOFT® Office SharePoint Server, or from any other type of program or service that manages documents for multiple users. In another implementation, one or more of the techniques described herein are implemented as features with other applications that interact with content management applications.

In one implementation, techniques are described for enabling users to create persistent document collections. The term "persistent document collection" as used herein is meant to include a group of one or more documents that are identified by a name or other identifier, and that get stored so that one or more users can access the underlying documents through the assigned grouping at later points in time. In another implementation, one or more of these persistent document collections can be accessed by one or more external applications to allow the user to work with them further from those external applications, or to allow those externals applications to perform other operations independently of the user. The term "external application" as used herein is meant to include an application that is separate from the document management application that created the persistent document collection(s).

Figure 1:
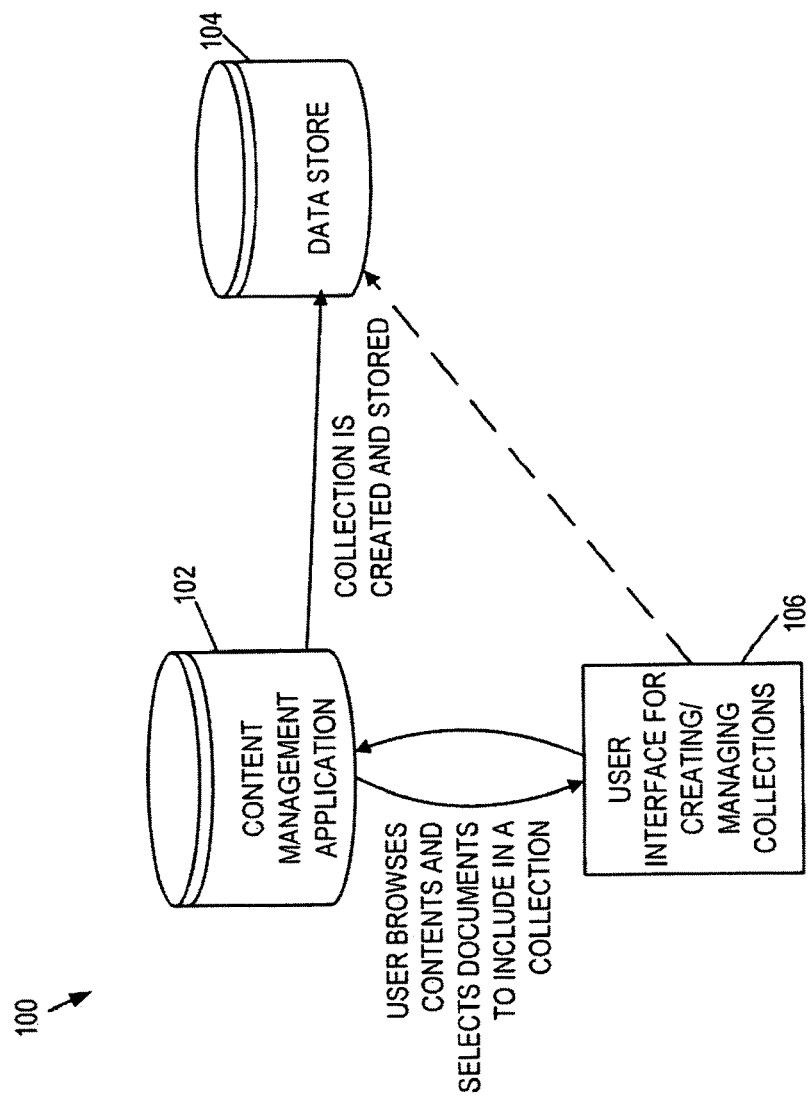
FIG. 1 is a diagrammatic view of one implementation of a system for creating and managing persistent document collections.

FIG. 1 is a diagrammatic view of one implementation of a system 100 for creating and managing persistent document collections. A content management application 102 is responsible for managing various documents that are created by multiple users. Content management application 102 enables users to organize the documents into various lists and/or libraries. The user communicates with the content management application 102 through a user interface 106, such as through a web browser. In such as browser-based scenario, the content management application 102 is located on one or more web servers. The user can use the user interface 106 to browse through documents in the content management application 102, and to then create one or more persistent document collections. A given user can create a particular persistent document collection to group together documents that he/she would like to work with on a more regular basis without having to locate them in their respective underlying libraries or other locations where they would normally be found in the content management application 102.

Once created, the persistent document collection(s) are then stored in one or more data stores, such as data store 104. Depending on the implementation used, the content management application 102 handles interactions with the data store 104 and/or user interface 106 handles interactions with the data store 104. For example, when content management application 102 is a web application that resides on a web server, and with user interface 106 being displayed to the user in a web browser, then content management application 102 may handle interactions with the data store 104 directly. In other implementations, user interface 106 may contain logic for interacting directly with the data store 104, such as when user interface and content management application 102 are contained as part of the same executable file on a client computer. In either scenario, by storing the document collection(s) that get created by the user, the same and/or other users are able to access this grouping of documents more easily on later interactions with the content management application 102.

Figure 2:
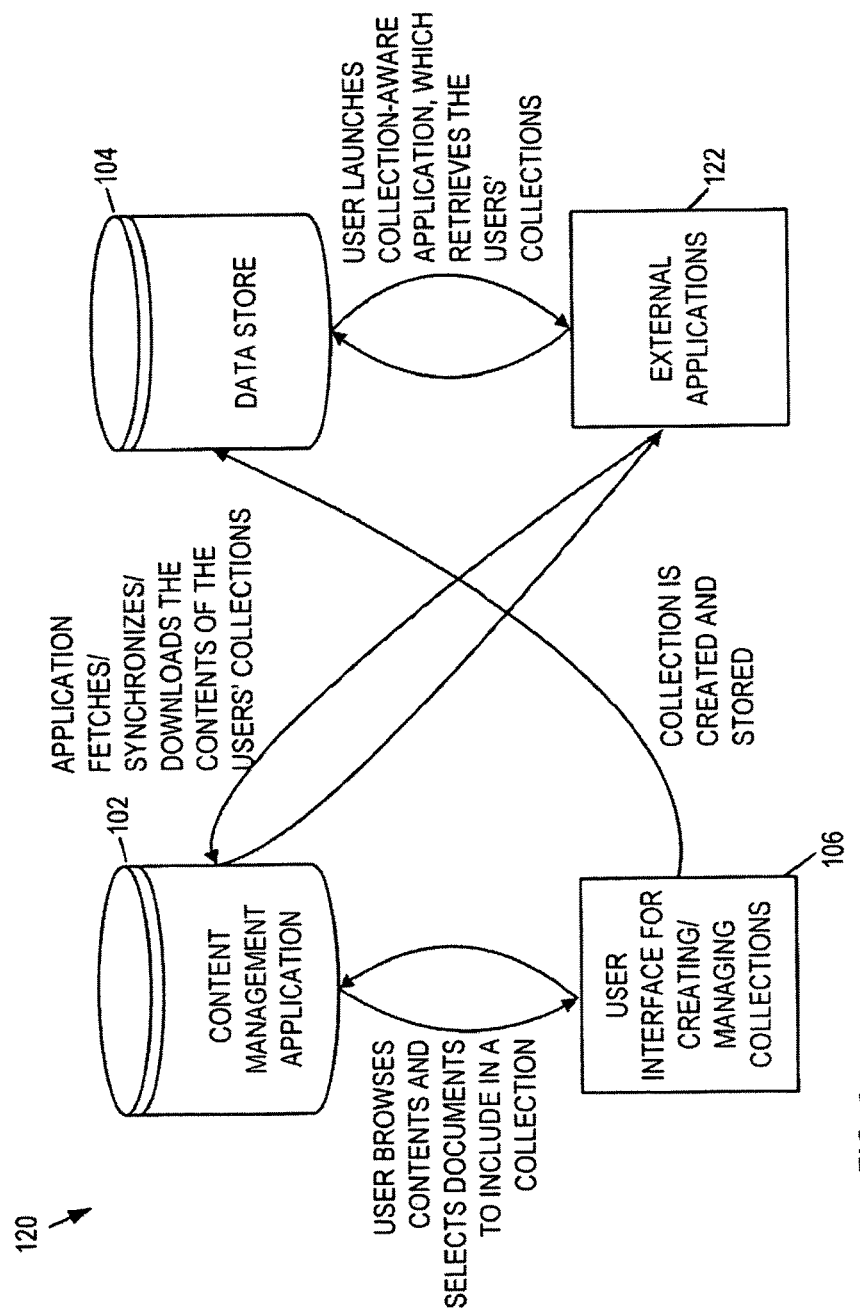
FIG. 2 is a diagrammatic view of another implementation of a system for creating and managing persistent document collections and enabling external application(s) to access the collections.

FIG. 2 is a diagrammatic view of another implementation of a system 120 for creating and managing persistent document collections and enabling external application(s) to access the collections. Since system 120 contains similar components as FIG. 1, the same reference numbers are used to indicate the same components. For example, system 120 also includes a content management application 102, data store 104, and user interface 106. System 120 also includes one or more external applications 122 that are "collection aware". These external applications 122 know that the content management application 102 manages persistent document collections, and it knows how to interact with the content management application 102 and the data store 104 to retrieve the persistent document collections and the underlying documents that they represent. In other words, with system 120, content management application 102 allows one or more external applications 122 to access and manage the documents represented in the persistent document collection(s). For example, the external application 122 may download the document to allow the user to work with those particular documents from within the external application 122 (and independently from the content management application 102). Systems 100 and 120 will now be described in further detail in the figures that follow.

Turning now to FIGS. 3-7, the stages for implementing one or more implementations of system 100 and/or system 120 are described in further detail. In some implementations, the processes and simulated screens of FIG. 2-12 are at least partially implemented in the operating logic of computing device 500 (of FIG. 13).

Figure 3:
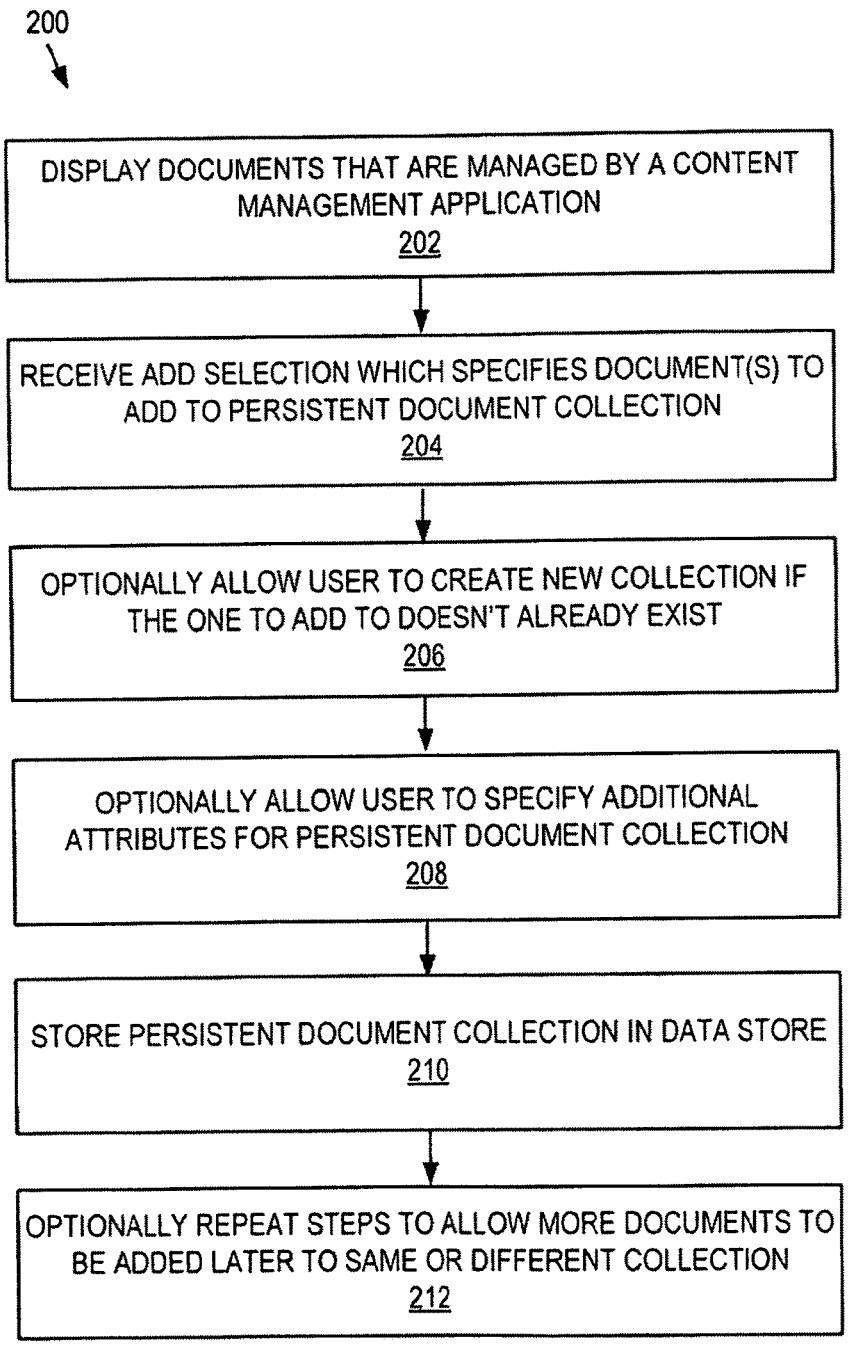
FIG. 3 is a process flow diagram for one implementation illustrating the stages involved in adding documents to a persistent document collection.

FIG. 3 is a process flow diagram 200 that illustrates one implementation of the stages involved in adding documents to a persistent document collection. Documents that are managed by a content management application are displayed (stage 202). An add selection is received which specifies one or more documents to add to a persistent document collection (stage 204). In other words, a selection is received from a user or programmatically to add one or more selected documents to a persistent document collection. The user can optionally create a new collection if the one that he/she wants to add the selected documents to does not already exist (stage 206). The user can optionally specify additional attributes for the persistent document collection (stage 208). One non-limiting example of an additional attribute includes a synchronization frequency 436 which specifies how frequently the collection should be synchronized with the documents downloaded to another location, such as the user's computer. Another non-limiting example includes a disk space attribute 438 to specify how much disk space should be allocated for storing the documents of the persistent document collection.

Yet another non-limiting example of an attribute that can be specified for a persistent document collection includes which one or more external applications should be allowed to access this persistent document collection. These are just a few non-limiting examples of the types of attributes that can be assigned to one or more persistent document collections. In other implementations, fewer and/or additional attributes could be used.

The persistent document collection is then stored in a data store (stage 210) so that the user who created it or other users with appropriate security permissions can access it later. The steps can be repeated to allow more documents to be added at a later time to this persistent document collection or a different persistent document collection (stage 212).

Figure 4:
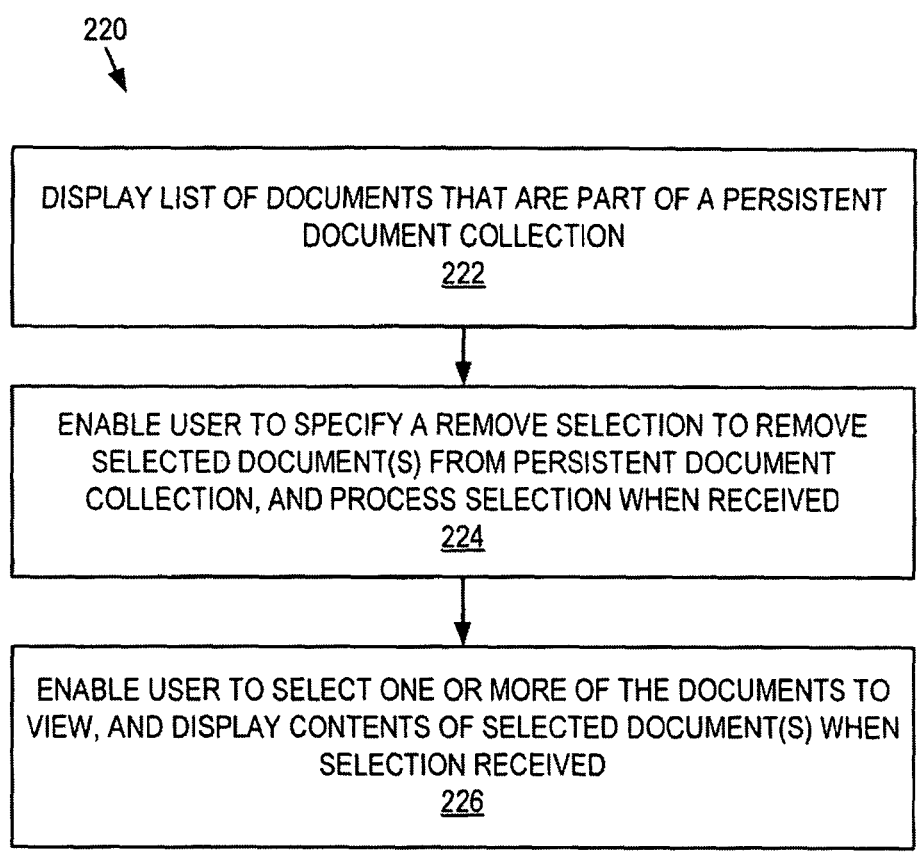
FIG. 4 is a process flow diagram for one implementation illustrating the stages involved in interacting with an existing persistent document collection.

FIG. 4 is a process flow diagram 220 that illustrates one implementation of the stages involved in interacting with an existing persistent document collection. Security permissions can be used to determine who is able to perform some or all of the steps described in FIG. 4. For example, a user who created a given persistent document collection may be provided with permission to view and modify that persistent document collection in the future. Permission may be granted to other users to view and/or modify a given collection, such as other members of the team that are responsible for the work related to the documents contained in a certain persistent document collection. Numerous other variations are also possible for controlling who is able to access a given persistent document collection.

A list of documents that are part of a persistent document collection are displayed (stage 222), such as on a computer screen of a user. The user is able to specify a remove selection to remove selected document(s) from the persistent document collection, and the content management application processes the user selection when it is received to remove the document from the specified persistent document collection (stage 224). Alternatively or additionally, the user is also able to select one or more of the documents to view, and the content management application displays the contents of the selected document(s) in a user interface of the user when such a selection is received from the user (stage 226).

Figure 5:
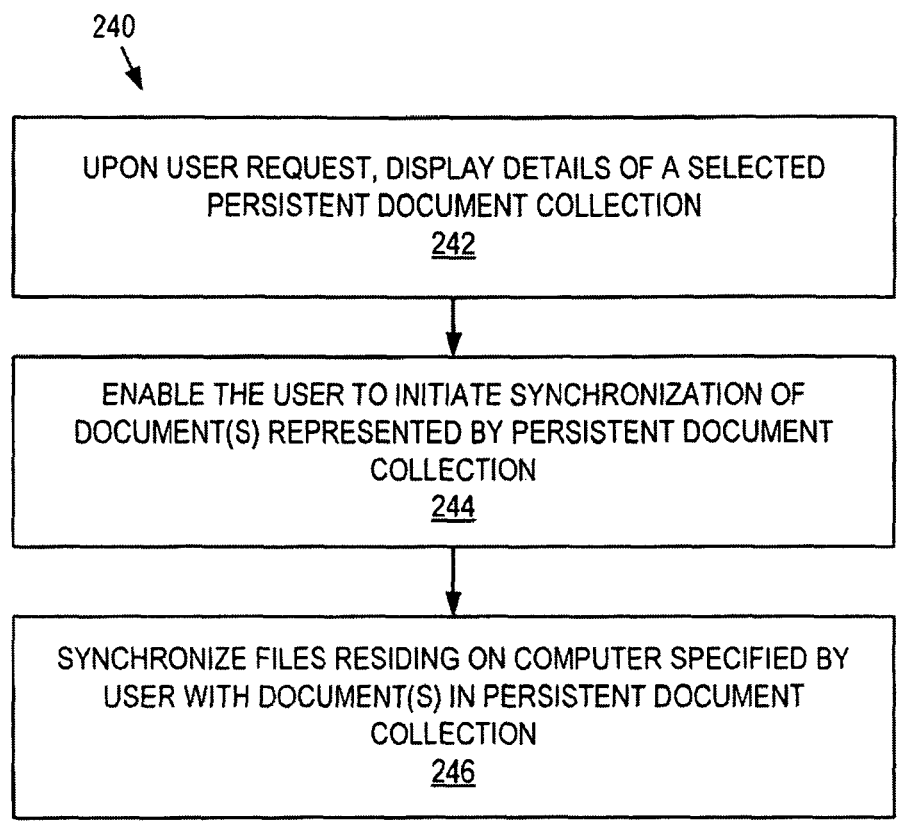
FIG. 5 is a process flow diagram for one implementation illustrating the stages involved in synchronizing files on a particular computer or location with the corresponding documents in one or more persistent document collections.

FIG. 5 is a process flow diagram 240 that illustrates one implementation of the stages involved in synchronizing files on a particular computer or location with the corresponding documents in one or more persistent document collections. Upon user request, details of a selected persistent document collection are displayed (stage 242). The user can initiate a synchronization of one or more documents represented by the persistent document collection (stage 244), or the synchronization can be initiated programmatically, such as on a scheduled basis. The files residing on the computer or location specified by the user are then synchronized with the corresponding document(s) represented in the persistent document collection (stage 246).

Figure 6:
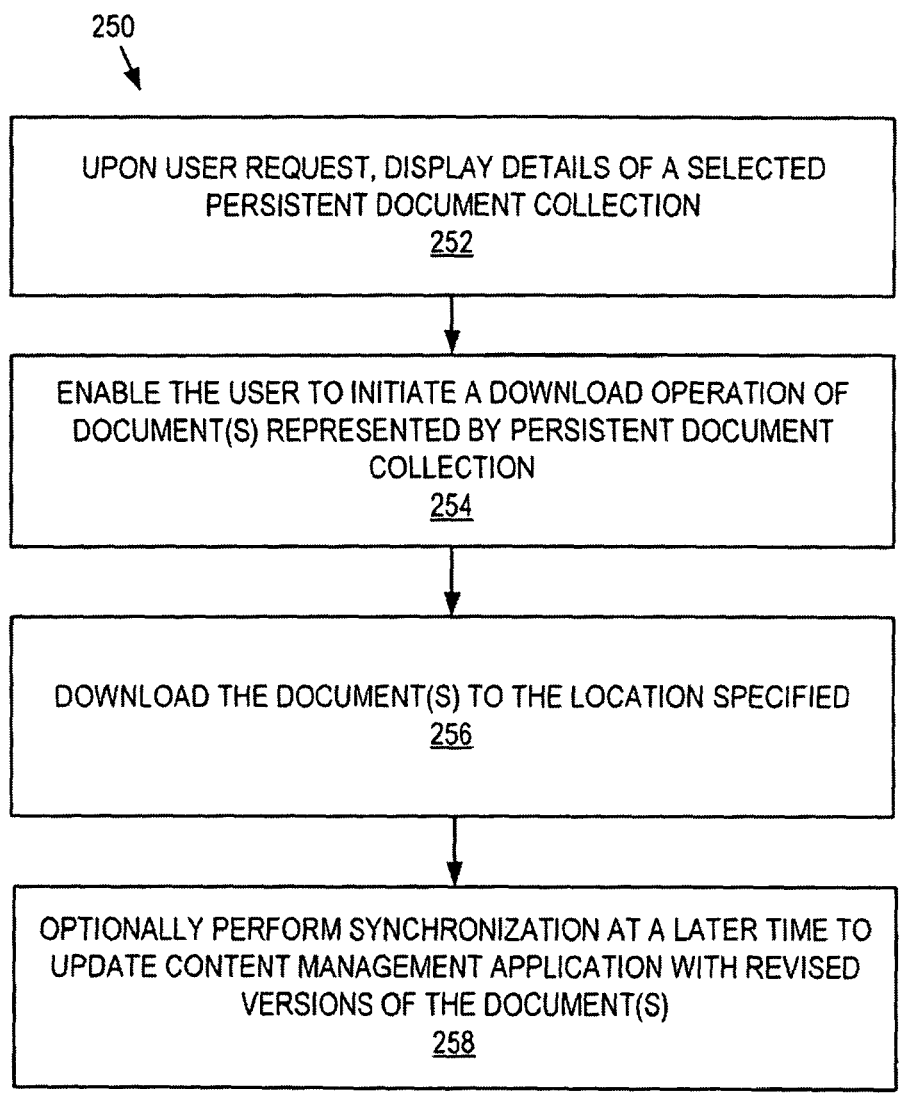
FIG. 6 is a process flow diagram for one implementation illustrating the stages involved in downloading one or more documents in a persistent document collection to a particular computer or location.

FIG. 6 is a process flow diagram 250 that illustrates one implementation of the stages involved in downloading one or more documents in a persistent document collection to a particular computer or location. Upon user request, details of a selected persistent document collection retrieved through the content management application and then displayed in a user interface to a user (stage 252). The user can initiate a download operation of one or more documents that are represented by a persistent document collection (stage 254), or the download operation can be initiated programmatically. The one or more documents are then downloaded to the location specified (stage 256). A synchronization operation can optionally be performed at a later time to update the content management application with the revised version(s) of the document(s) (stage 258). An exemplary synchronization process was previously described in detail in FIG. 5.

Figure 7:
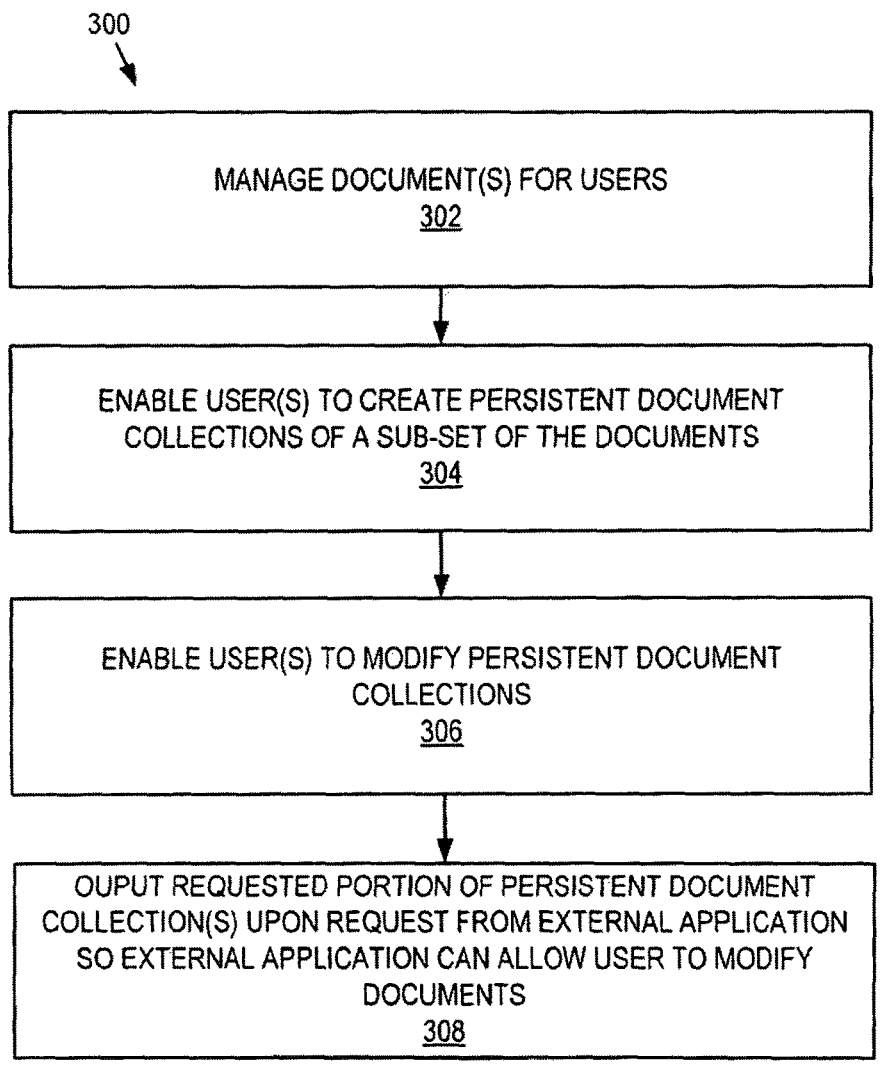
FIG. 7 is a process flow diagram for one implementation that illustrates the stages involved in allowing external application(s) to access the content management application to work with the persistent document collection(s).

FIG. 7 is a process flow diagram 300 that illustrates one implementation of the stages involved in allowing external application(s) to access the content management application to work with the persistent document collection(s). A content management application is used to manage one or more documents for one or more users (stage 302). Users are able to create persistent document collections of a sub-set of the documents in the content management application (stage 304). One or more users are able to modify the persistent document collections (stage 306). In one implementation, security permissions that were described in the discussion of FIG. 4 are used to determine who can access a particular persistent document collection. The request portion of the persistent document collection(s) is output to an external application upon receiving a request from the external application for the collection(s) (stage 308). The external application can then use the information in one of various ways, such as to allow the user to modify the documents in that external application (instead of through the content management application itself).

Turning now to FIGS. 8-12, simulated screens are shown to illustrate a user interface for some implementations of system 100 and/or system 120. These screens can be displayed to users on output device(s) 511 (of FIG. 13). Furthermore, these screens can receive input from users from input device(s) 512 (of FIG. 13).

Figure 8:
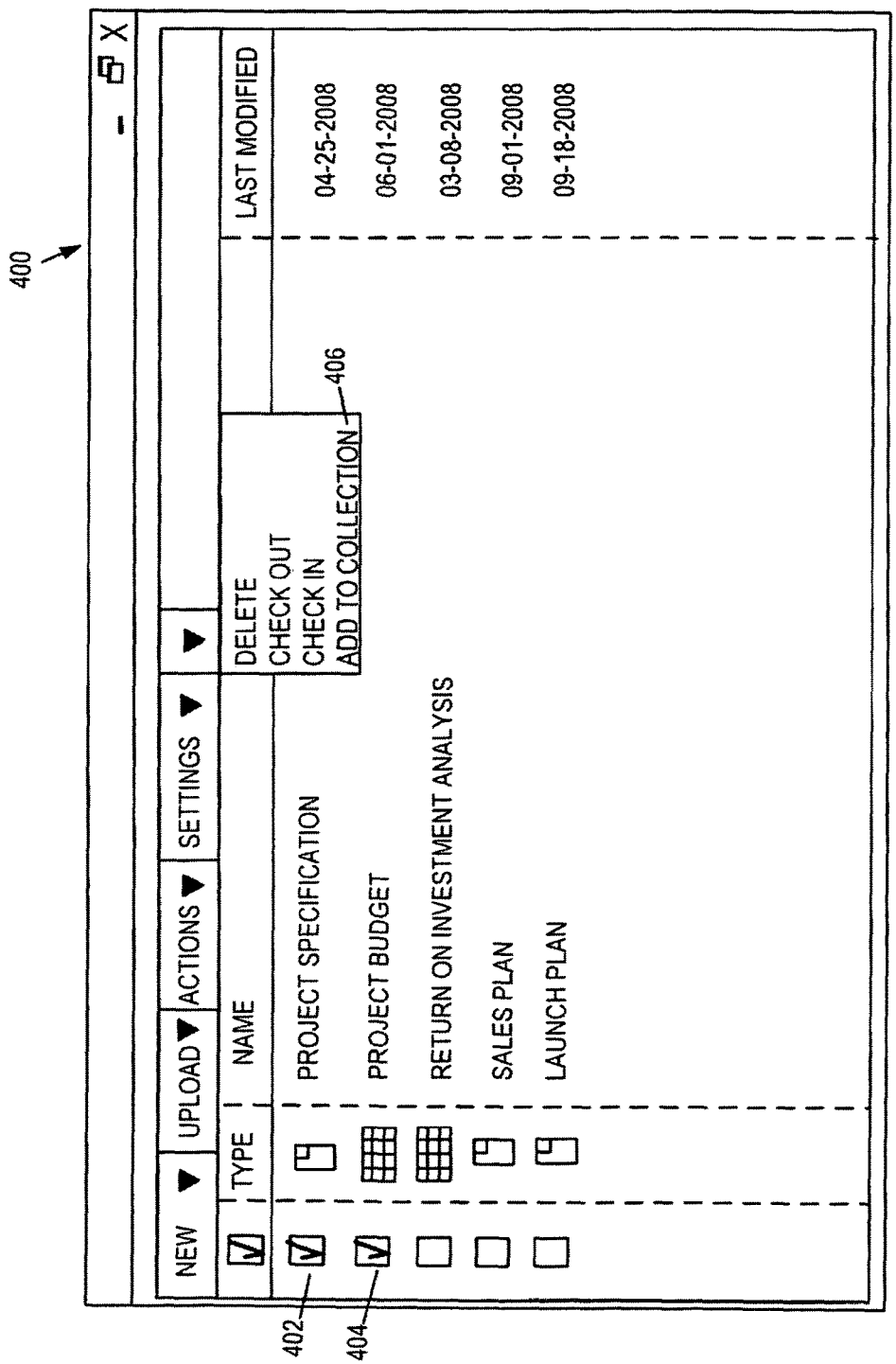
FIG. 8 is a simulated screen for one implementation that illustrates adding selected documents to a persistent document collection.

FIG. 8 is a simulated screen 400 for one implementation that illustrates adding selected documents to a persistent document collection. In the example shown on the screen, the user of a content management application is browsing the documents in a particular library of the application. The user then selects two of the documents (402 and 404, respectively), and selects the add option 406 to add the selected documents to a persistent document collection. At that point, the user is then prompted to specify what persistent document collection to add the documents to, such as through a screen similar to FIG. 9, which is discussed next.

Figure 9:
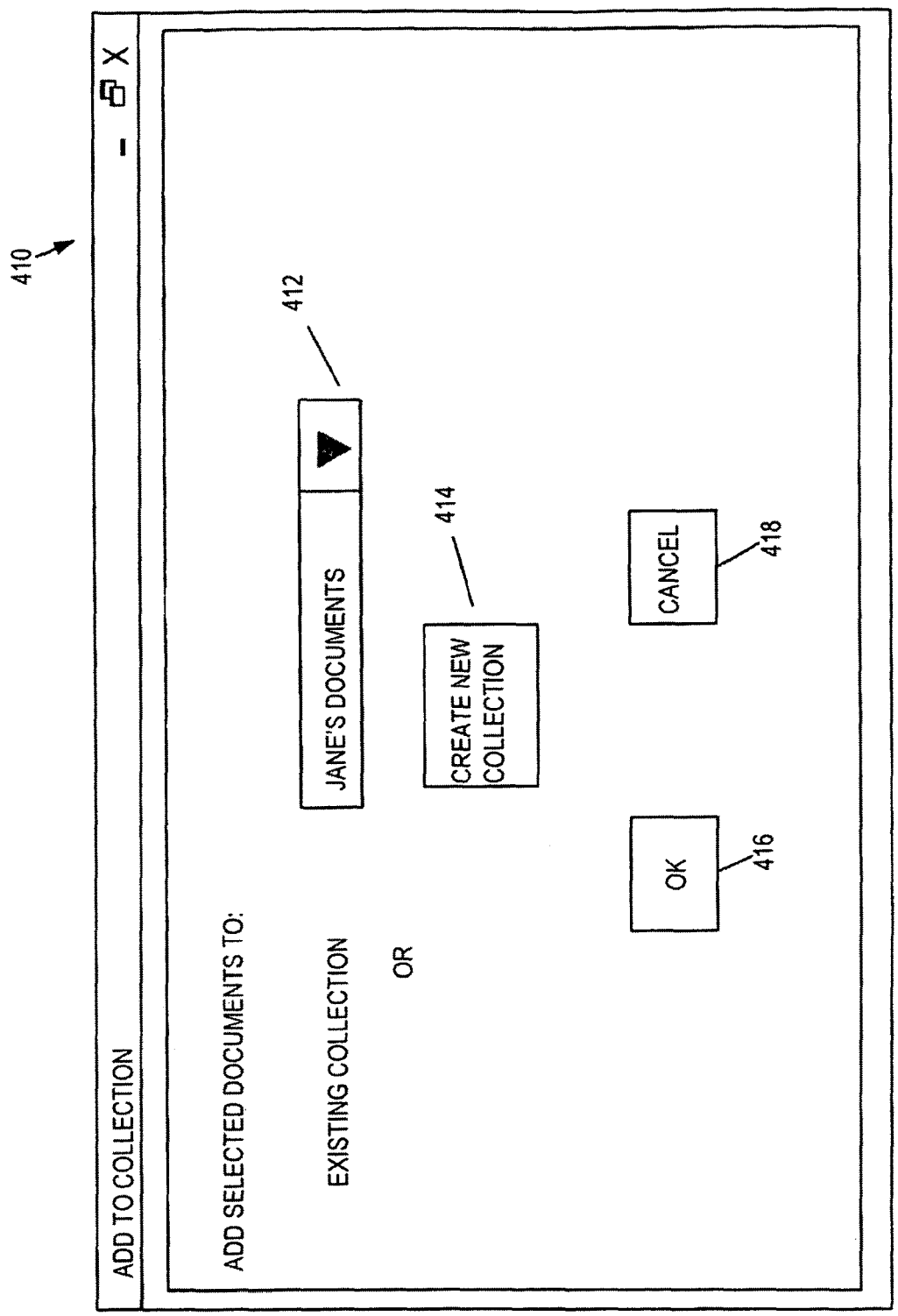
Figure 10:
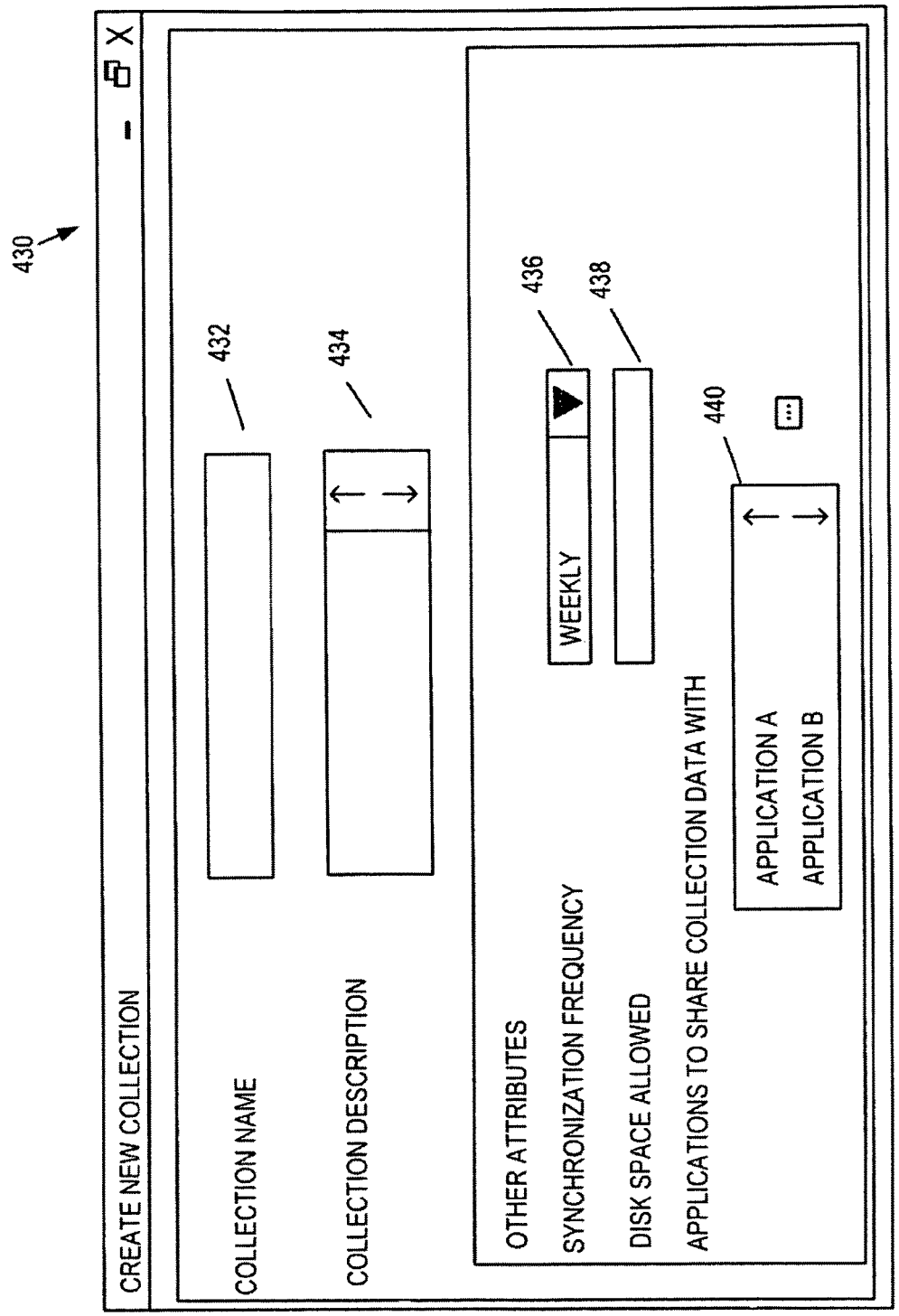
FIG. 10 is a simulated screen for one implementation that illustrates creating a new persistent document collection.

FIG. 9 is a simulated screen 410 for one implementation that illustrates selecting a persistent document collection to add the selected documents to. In the example shown, the user is able to select an existing persistent document collection 412 to add the selected documents to, or to select the create new collection option 414. If the user selects the create new collection option 414, then a screen similar to the one shown in FIG. 10 is displayed, which will be discussed momentarily in more detail. If the user selects an existing persistent document collection 412, then the selected documents are simply added to that collection. The user's selection is processed when the user selections a finalize option 416, such as an OK button. The user can cancel the operation so that the selected documents are not added to a persistent document collection by selecting a cancel option 418.

FIG. 10 is a simulated screen 430 for one implementation that illustrates creating a new persistent document collection. In the instance that the user selected an option to create a new persistent document collection that does not already exist (such as by selecting the create new collection option 414 on FIG. 9), then a screen such as FIG. 10 is shown. In this example, various details about the new collection can be provided, such as a collection name 432, collection description, and/or other attributes for the collection. A few non-limiting examples of other attributes include a synchronization frequency 436, the amount of disk storage space 438 to be allowed for this collection, and/or the external applications 440 that this persistent document collection can share its documents with. Numerous other types of attributes and/or information about a particular persistent document collection could be utilized in other implementations. These are just shown here for the sake of illustration.

Figure 11:
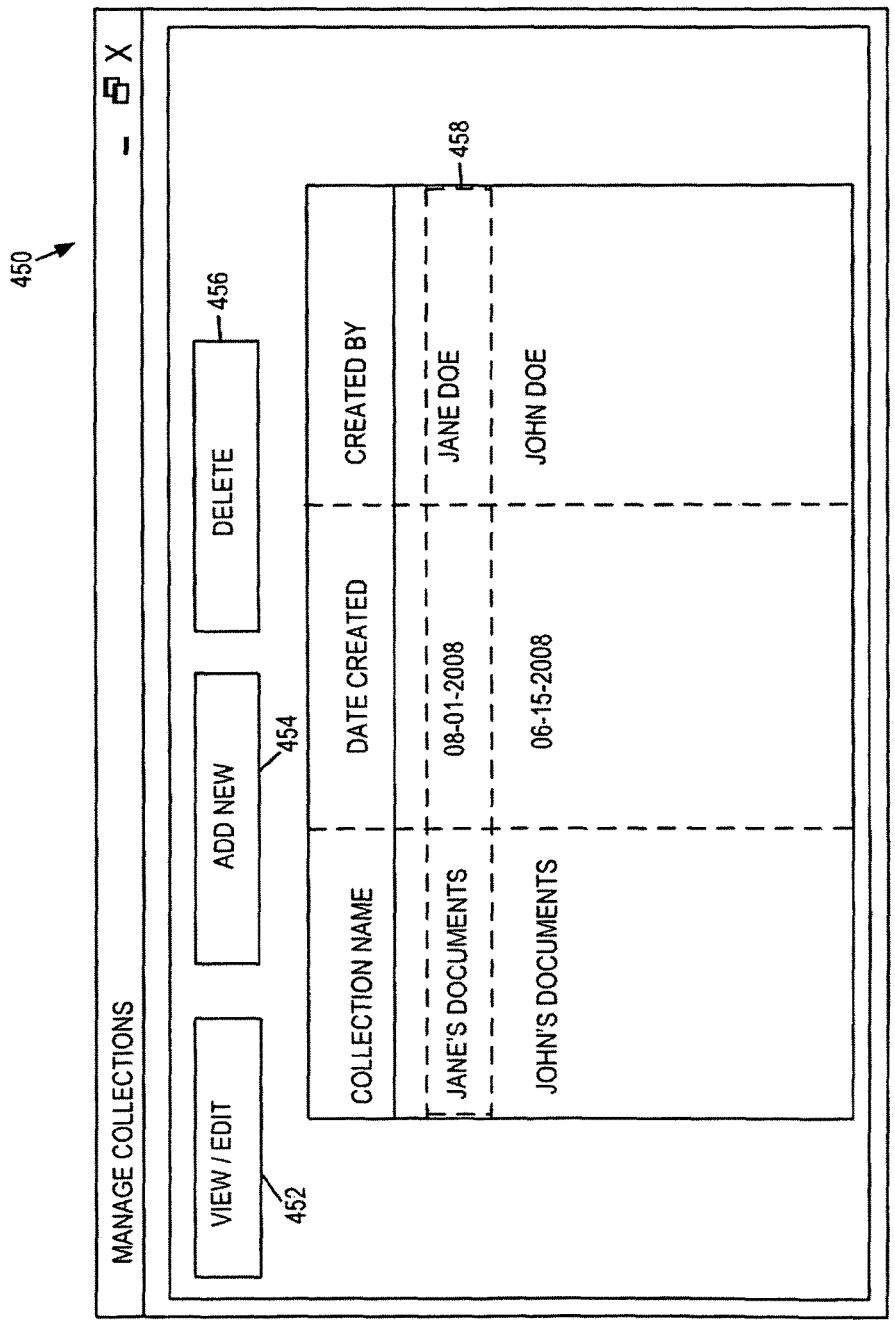
FIG. 11 is a simulated screen for one implementation that illustrates managing existing persistent document collections.

Turning now to FIG. 11, a simulated screen 450 is shown for one implementation that illustrates managing existing persistent document collections. In this example, the user has selected an option to view one or more persistent document collections that he is allowed to view and/or edit. Upon selecting a particular persistent document collection in the list 458, such as Jane's Documents, the user is then able to select one or more options to perform on that collection. For example, the user can select the view/edit option 452 to view and/or edit the contents of that collection. In such a scenario, a screen similar to one shown in FIG. 12 could be displayed to allow the user to view and/or edit the selected persistent document collection, which will be discussed momentarily. The user can select the delete option 456 to delete the selected persistent document collection. If the user wants to create a new persistent document collection altogether, then he/she can select the add new option 454.

Figure 12:
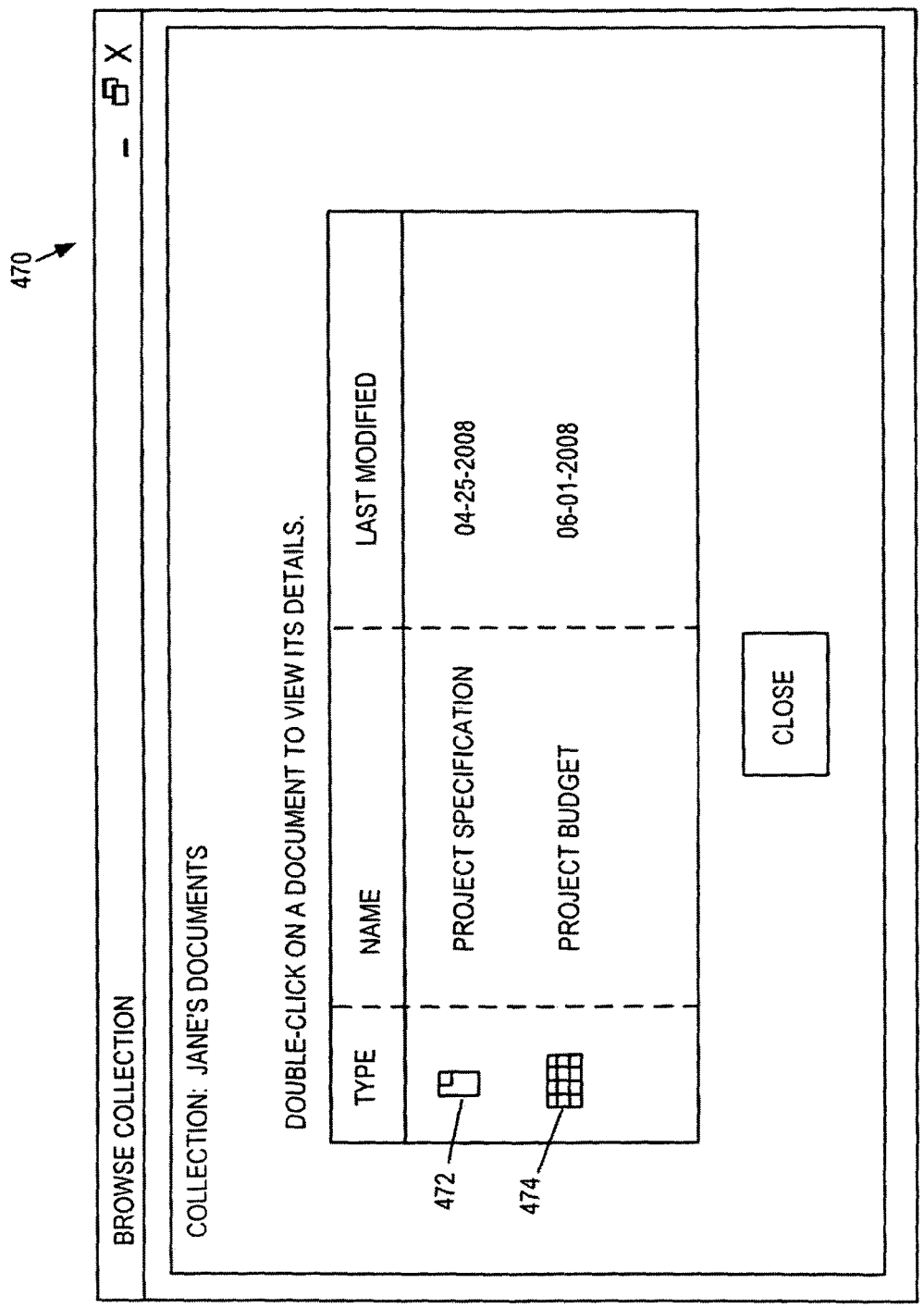
FIG. 12 is a simulated screen for one implementation that illustrates browsing the details of a selected persistent document collection.

FIG. 12 is a simulated screen 470 for one implementation that illustrates browsing the details of a selected persistent document collection. In this example, the collection called Jane's Documents is the one that the user selected to view in more detail. Upon double-clicking or otherwise selecting a view option, the user can view the actual contents of a particular document. For example, if the user double-clicks on document 472, then the actual contents of the project specification document will be displayed on the screen in a viewer or other program that can read that file format. If the user double-clicks on the project budget spreadsheet 474, then the actual contents of the project budget spreadsheet 474 will be displayed on the screen in a viewer or program that can read that file format. Alternatively or additionally, operations can be performed to multiple documents in the persistent document collection at the same time, such as to synchronize the selected ones to a local machine, etc.

Figure 13:
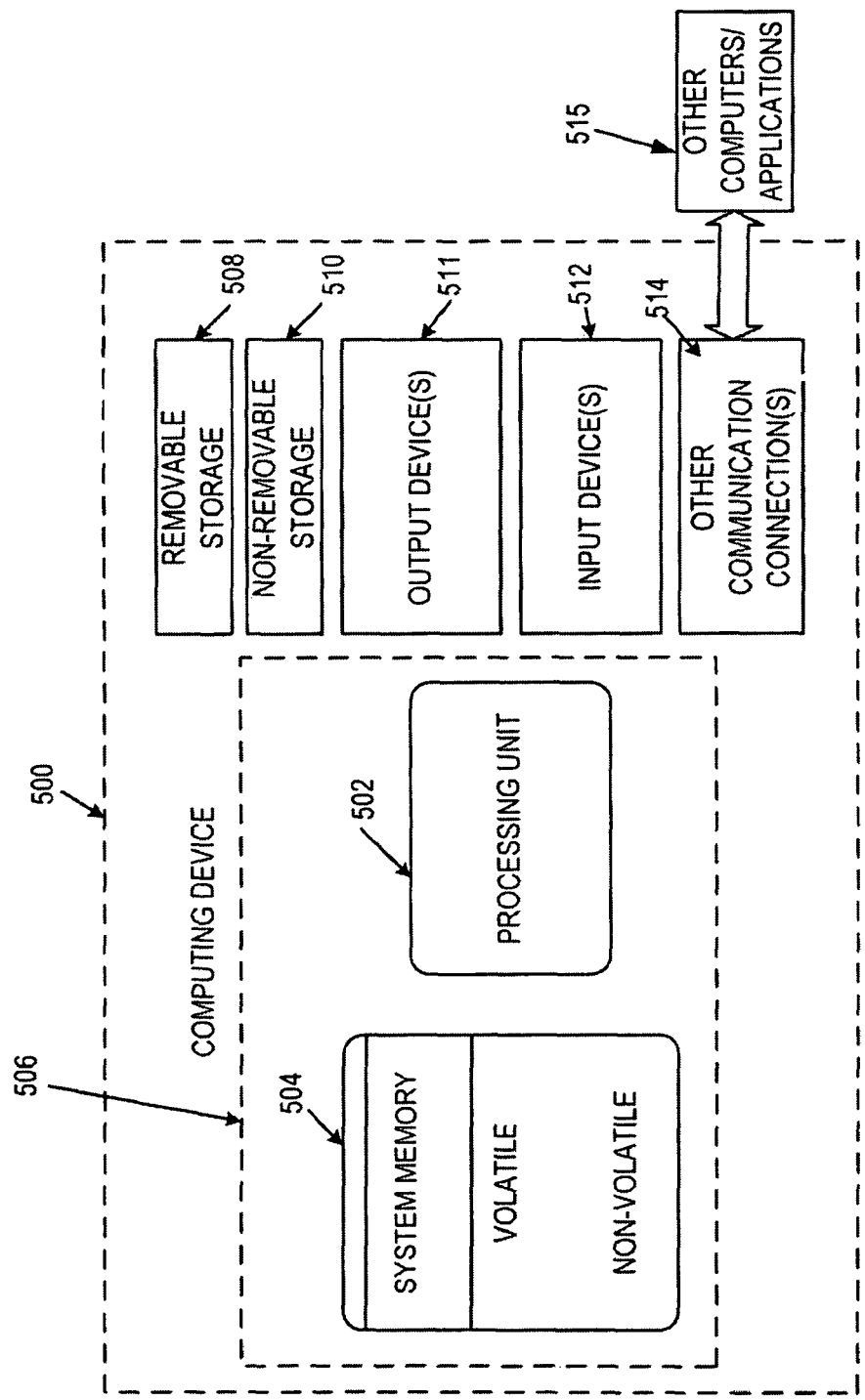
FIG. 13 is a diagrammatic view of a computer system of one implementation.

As shown in FIG. 13, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 13 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 13 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A system comprising:
a memory;
a data store to store documents; and
a content management application, stored in the memory and executed by a processing circuit, to:
process input via a web browser specifying creation of a persistent document collection of a sub-set of the documents for sharing among of a plurality of users via the web browser based on user permissions assigned to the persistent document collection,
receive an add selection from the web browser which specifies at least one document of the documents to add to the persistent document collection,
assign a first attribute and a second attribute to the persistent document collection, the first attribute specifying one or more external applications to access the sub-set of the documents, and the second attribute indicating whether the persistent document collection is to be synchronized with data provided by at least one of the plurality of users,
store the persistent document collection comprising at least one document of the documents in another data store having storage space allocated to the persistent document collection in accordance with a specified amount of disk space;
receive a request from an external application specified by the first attribute for collection information regarding a portion of the persistent document collection;
retrieve the portion of the persistent document collection upon receiving the request so that the external application can access the portion of the persistent document collection as a group;
return the portion of the persistent document collection to the external application according to the first attribute,
perform operations on the portion of the persistent document collection independently from an application that created the persistent document collection, wherein the performing operations include removing the at least one document from the persistent document collection or updating the at least one document using a revised version of the at least one document, the revised version of the at least one document belonging to the persistent document collection; and
synchronize the sub-set of the documents represented by the portion of the persistent document collection with documents downloaded to a computer based on the second attribute.

2. The system of claim 1, in response to the request from the external application, the content management application is further operative to retrieve the collection information from the data store and return the collection information to the external application.

3. The system of claim 2, wherein the collection information that is provided to the external application is used by the external application to allow management of the sub-set of the documents that are represented by the collection information.

4. The system of claim 1 wherein in response to the request from the external application, the content management application is further operative to enable downloading of the sub-set of the documents that are represented by the collection information.

5. The system of claim 4, wherein the external application is to download the sub-set of the documents that are represented by the collection information.

6. The system of claim 4, wherein the external application is to modify the sub-set of the documents that are represented by the collection information.

7. The system of claim 1, wherein the content management application is further operable to enable documents represented by a portion of the persistent document collection to be downloaded for further modification.

8. The system of claim 1 wherein the second attribute specifies the amount of disk space measured in a multiple of bits or a multiple of bytes to allocate to the persistent document collection.

9. A computer-implemented method comprising:
displaying, by a computer system, a plurality of documents that are managed by a content management application that receives input via a web browser;
receiving, by the computer system, an add selection from the web browser which specifies at least one document of the plurality of documents to add to a persistent document collection, the persistent document collection having been created by an application and comprising a grouping of a sub-set of the plurality of documents, the at least one document of the plurality of documents being shared and accessed by a plurality of users based on user permissions assigned to the persistent document collection;
assigning to the persistent document collection a first attribute that specifies one or more external applications allowed to access the sub-set of the plurality of documents, and a second attribute that indicates whether the persistent document collection is to be synchronized with data provided by at least one of the plurality of users;
storing the persistent document collection comprising the at least one document of the plurality of documents in a data store having storage space allocated to the persistent document collection in accordance with a specified amount of disk space;
receiving a request from an external application identified by the first attribute for collection information regarding the sub-set of the plurality of documents;
retrieving, by the computer system, the sub-set of the plurality of documents upon receiving the request from the external application so that the external application can access the sub-set of the plurality of documents as a group, and returning the collection information to the external application;
performing operations on the retrieved sub-set of the plurality of documents independently from the application that created the persistent document collection, wherein the performing operations include removing a first document from the persistent document collection or updating a second document using a revised version of the second document, the revised version of the second document belonging to the persistent document collection; and
synchronizing the sub-set of the plurality of documents represented by a portion of the persistent document collection with documents downloaded to the computer system based on the second attribute.

10. The method of claim 9, further comprising: at a later point in time, receiving another add selection which specifies another one or more of the plurality of documents to add to a different persistent document collection.

11. The method of claim 9, further comprising: at a later point in time, receiving another add selection which specifies another one or more of the plurality of documents to add to the persistent document collection.

12. The method of claim 9, further comprising: at a later point in time, receiving a remove selection which specifies at least one or more of the plurality of documents to remove from the persistent document collection.

13. The method of claim 9, further comprising: enabling downloading of a portion of the documents that are represented by the persistent document collection for further modification.

14. Computer-readable storage hardware having computer-executable instructions for causing a computer to perform operations comprising:
displaying a plurality of documents that are managed by a content management application that receives input via a web browser;
receiving an add selection from the web browser which specifies at least one document of the plurality of documents to add to a persistent document collection, the persistent document collection that is created by an application comprising a grouping of a sub-set of the plurality of documents, the at least one document of the plurality of documents being shared and accessed by a plurality of users based on user permissions assigned to the persistent document collection;
assigning a first attribute and a second attribute to the persistent document collection, wherein the first attribute specifies one or more external applications allowed to access the sub-set of the plurality of documents, and the second attribute indicates whether the persistent document collection is to be synchronized with data provided by at least one of the plurality of users;
storing the persistent document collection comprising the at least one document of the plurality of documents in a memory having storage space allocated to the persistent document collection in accordance with a specified amount of disk space;
receiving a request from an external application identified by the first attribute for collection information regarding the sub-set of the plurality of documents;
retrieving the sub-set of the plurality of documents upon receiving the request from the external application so that the external application can access the sub-set of the plurality of documents as a group, and returning the collection information to the external application;
performing operations on the retrieved sub-set of the plurality of documents independently from the application that created the persistent document collection, wherein the performing operations include removing a first document from the persistent document collection or updating a second document using a revised version of the second document, the revised version of the second document belonging to the persistent document collection; and
synchronizing the sub-set of the plurality of documents represented by a portion of the persistent document collection with documents downloaded to a computer based on the second attribute.

* * * * *